March 18, 1930.  J. M. P. WALLACE  1,751,433
WEATHER VANE
Filed March 8, 1928

INVENTOR
James M. Power Wallace
By H.W. Williamson
Atty.

Patented Mar. 18, 1930

1,751,433

UNITED STATES PATENT OFFICE

JAMES M. POWER WALLACE, OF NORRISTOWN, PENNSYLVANIA

WEATHER VANE

Application filed March 8, 1928. Serial No. 259,975.

My invention relates to new and useful improvements in a weather vane and has for its primary object to provide an exceedingly simple and effective device of this character which will be exceedingly sensitive to the light and changing wind currents and one that will be light in weight though strong and durable.

Another object of the invention is to provide means for mounting the vane element upon ball bearings carried by the staff.

A further object of my invention is to so construct the post of the vane element as to protect the ball bearings from rain, sleet, snow and the like.

A still further object of the invention is to provide a post of unique construction so that vane elements of different configurations may be readily connected therewith.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which.

Figure 1:
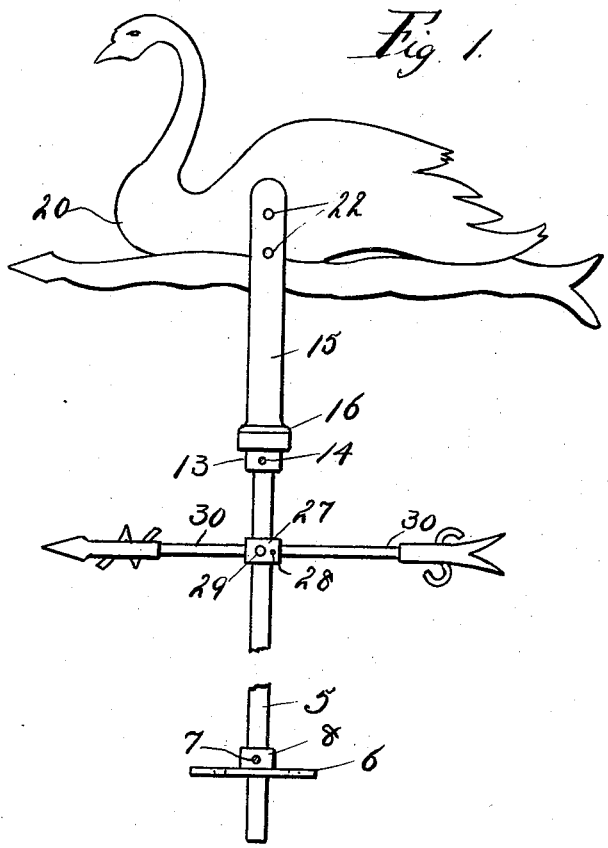
Fig. 1, is a side elevation of a weather vane constructed in accordance with my invention.
Figure 2:
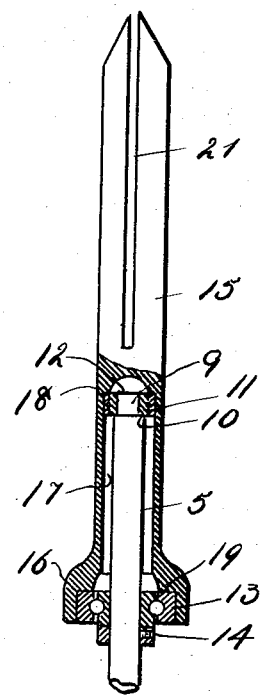
Fig. 2, is an enlarged side elevation of the post and a portion of the staff, a part of said post and the ball bearings being shown in section.

In carrying out my invention as herein embodied, 5 represents a staff preferably formed from a metal rod and having slidably and rotatably mounted thereon a base 6 by which the device is secured to a support such as a roof of a building and after the parts are properly adjusted they are held together by a set screw 7 passing through a boss 8 on the base and impinging on the staff.

The upper end of the staff 5 is provided with a reduced tip 9 producing a shoulder 10 on which rests the inner race of an ordinary ball bearing 11 and which is held in place by upsetting or forming a head 12 on the staff tip.

On the staff a suitable distance below the ball bearing 11 is mounted a second and preferably larger ball bearing 13 which is held in position by a set screw 14 passing through an extension of the inner race member.

Over the ball bearings is placed a post 15 having an enlargement 16 at its lower end, said post being provided with a bore 17 running from its inner or lower end to a point approximately equal to the distance between the two ball bearings providing a shoulder 18 engaging the outer race member of the ball bearing 11 while the lower end of the post is counterbored to provide a shoulder 19 to rest upon the outer race member of the ball bearing 13.

The post 15 carries a vane element 20. By stating that the vane element is carried by the post, I mean that it may be formed integral therewith or attached thereto in any suitable manner, although I prefer to form the post with a slot 21 at its upper end into which may be inserted a lug or any other part of the vane element, and said vane element then fastened in place by rivets 22 or their equivalent.

The vane element may be of any desirable configuration.

Figure 3:
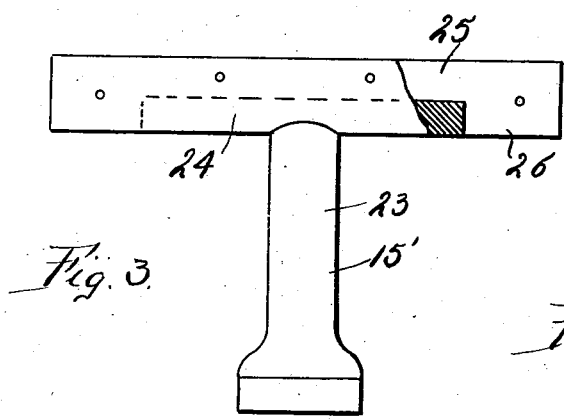
Fig. 3, is a side elevation, partly in section, of a modified form of post.
Figure 4:
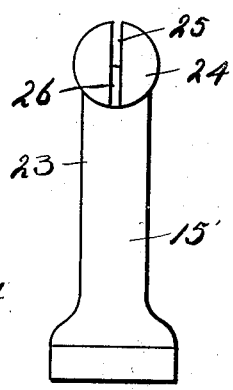
Fig. 4, is an end view thereof.

In Figs. 3 and 4 I have shown a slight modification of the post and have therefore designated the same as 15' and said modification includes a body 23 constructed the same as the lower portion of the post 15, but on the upper end of the body is formed a cross bar 24 having a longitudinal slot 25 to receive the vane element and said slot at the ends may run across the complete diameter of the cross bar as indicated at 26. This form of post is particularly adapted for use with certain kinds of vane elements where it is necessary to have additional strength or bearing surface.

On the staff 5 below but preferably adjacent the lower ball bearing is mounted a collar 27 held in place by a suitable fastening device 28 such as a rivet and this collar is provided with four holes, one of which is shown and designated by the numeral 29, the said holes being at right angles to each other for the reception of the direction arms 30. It is preferable that only two of these arms be used, one to represent the head of an arrow, and the other the tail thereof, but where a person desires that the four main points of the compass be shown, two other arms may be placed in the remaining holes of the collar.

From the foregoing description it will be obvious that the posts may be manufactured as standard equipment and assembled with vane elements of various configurations and when mounted in place, the ball bearings will be substantially housed to prevent the dust, rain, sleet or snow from coming in contact therewith, and therefore, the device will always be in operative condition.

Of course I do not wish to be limited to the exact details of construction as herein shown, as these may be varied within the limits of the appended claims without departing from the spirit of my invention.

Having thus fully described my invention, what I claim as new and useful is:

1. In a weather vane, the combination of a staff for mounting upon a suitable support, the upper end of said staff having a reduced tip forming a shoulder, a ball bearing mounted on the extremity of the tip, a second ball bearing mounted on the staff below the first mentioned one and in spaced relation thereto, means to hold the second named ball bearing in place, a post having an enlarged lower end, the lower portion of said post being hollow, shoulders within the hollow portion of the post and spaced a distance equal to the space between the ball bearings and adapted to engage the movable race members of the ball bearings and substantially enclose said ball bearings when the post is placed over the upper end of the staff, said post having its upper end longitudinally slotted, and a vane element mounted within said slot and fixed to the post.

2. In a weather vane, a staff, a ball bearing having a fixed position at the extreme upper end of the staff, another ball bearing mounted on the staff below the first ball bearing, means to hold said second-named ball bearing in different adjusted positions, a post having a hollow portion within which there are two shoulders in spaced relation for coaction with the aforementioned ball bearings, and a vane element carried by said post.

In testimony whereof, I have hereunto affixed my signature.

JAMES M. POWER WALLACE.